No. 663,836. Patented Dec. 11, 1900.
F. E. & F. O. STANLEY.
RUNNING GEAR FOR VEHICLES.
(Application filed Aug. 8, 1899.)

(No Model.) 3 Sheets—Sheet 1.

No. 663,836. Patented Dec. 11, 1900.
F. E. & F. O. STANLEY.
RUNNING GEAR FOR VEHICLES.
(Application filed Aug. 8, 1899.)

(No Model.) 3 Sheets—Sheet 2.

Witnesses
J. G. Hinkel
Arthur A. Fisher

Inventors
Francis E. Stanley
Freelan O. Stanley
by Foster Freeman
Attorneys

No. 663,836. Patented Dec. 11, 1900.
F. E. & F. O. STANLEY.
RUNNING GEAR FOR VEHICLES.
(Application filed Aug. 8, 1899.)
(No Model.) 3 Sheets—Sheet 3.
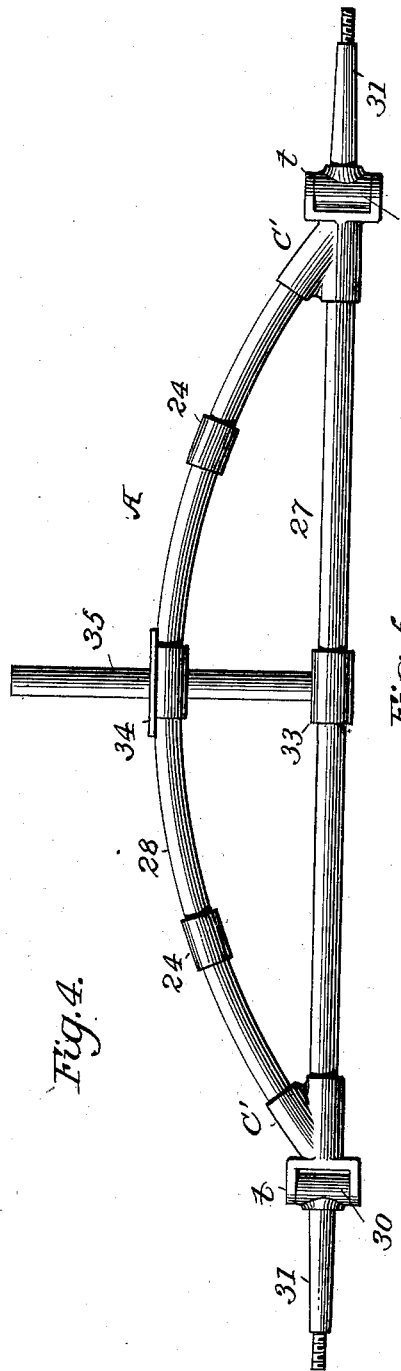
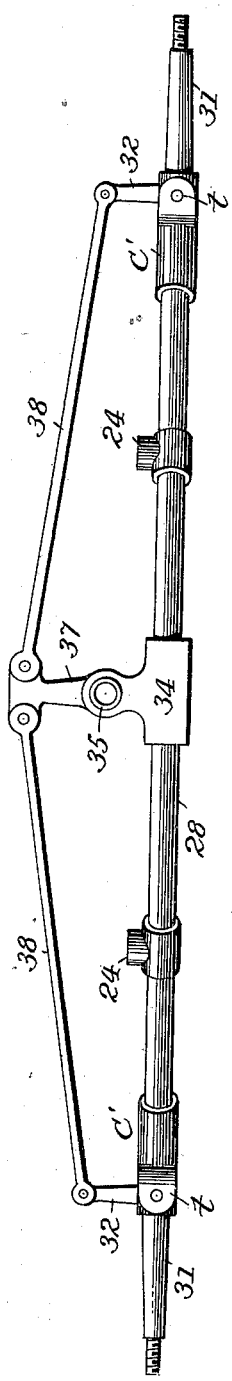
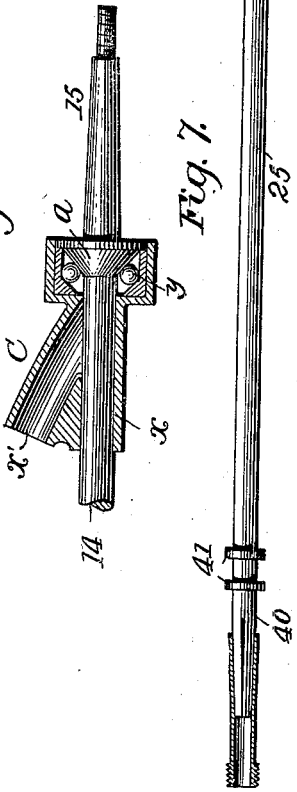

UNITED STATES PATENT OFFICE.

FRANCIS E. STANLEY AND FREELAN O. STANLEY, OF NEWTON, MASSACHUSETTS, ASSIGNORS, BY MESNE ASSIGNMENTS, TO THE STANLEY AUTOMOBILE COMPANY, OF NEW YORK, N. Y.

RUNNING-GEAR FOR VEHICLES.

SPECIFICATION forming part of Letters Patent No. 663,836, dated December 11, 1900.

Application filed August 8, 1899. Serial No. 726,613. (No model.)

*To all whom it may concern:*

Be it known that we, FRANCIS E. STANLEY and FREELAN O. STANLEY, citizens of the United States, residing at Newton, in the county of Middlesex and State of Massachusetts, have invented certain new and useful Improvements in Running-Gear for Vehicles, of which the following is a specification.

Our invention relates to the running-gear of vehicles, and more especially to that of motor-vehicles, although parts are adapted to vehicles of a different character; and our invention consists in constructing the axles and perches and connecting and adapting the same to support the springs and other parts, as fully set forth hereinafter and as illustrated in the accompanying drawings, in which—

Figure 1:
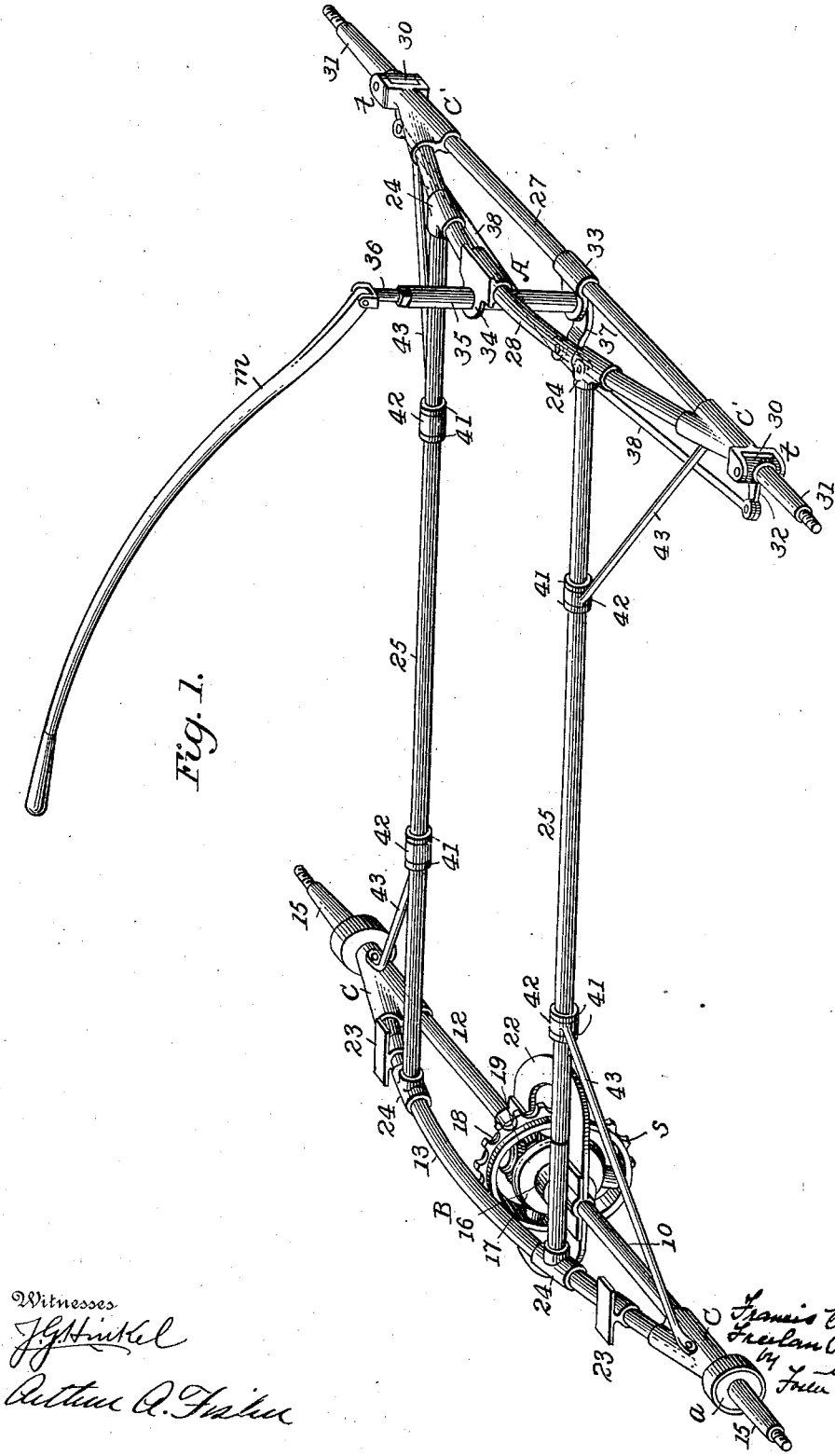
Figure 2:
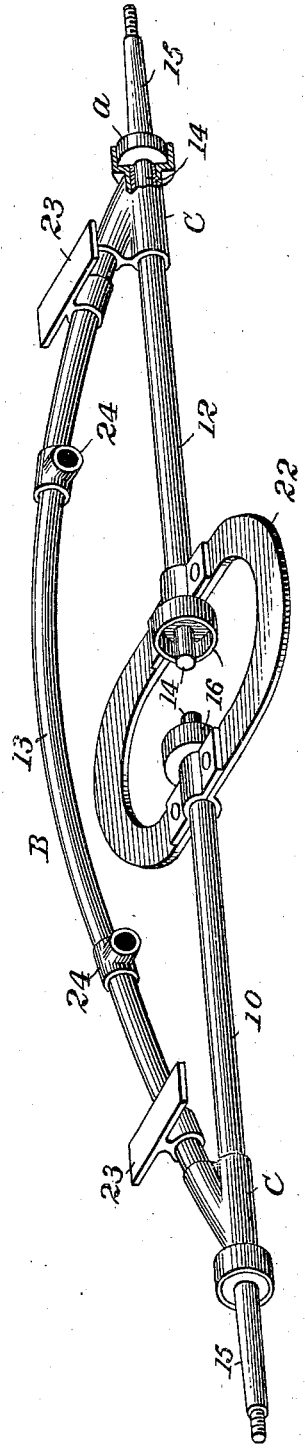
Figure 3:
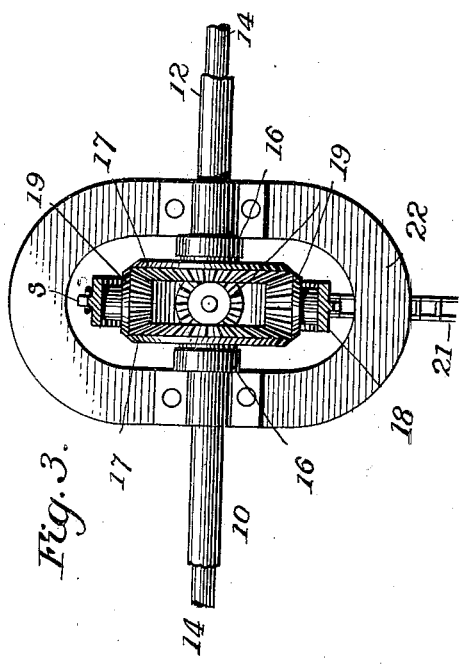

Figure 1 illustrates in perspective the improved running-gear. Fig. 2 is a perspective view of the rear or driving axle; Fig. 3, a detached plan view of the central part of the rear axle; Fig. 4, an elevation of the front or steering axle; Fig. 5, a plan of the front axle; Fig. 6, an enlarged section of one of the socket-pieces, and Fig. 7 a detached part-sectional view of one of the perches.

The forward axle A is the steering-axle, and the rear axle B is the driving-axle.

The rear axle B, as best shown in Figs. 2 and 3, consists of two separated tubes 10 12, in line with each other, and an arched member 13, preferably tubular. Each end of the arched member 13 and one end of each straight member 10 or 12 extends into sockets $x\,x'$, Fig 6, in union-pieces C, the lower socket $x$ receiving the end of the straight member and the upper socket $x'$ being at such an angle to the lower socket as to properly receive the end of the arched member 13. The outer end of the union-piece C is expanded to form a recess $y$ to receive the ball-bearing collar $a$ upon a shaft 14, terminating in the journal 15, to which the hub of the wheel of any suitable character is fixedly secured. At the inner end of each straight section 10 and 12 of the axle is an enlarged box 16 for receiving the ball-bearing hub of a bevel-wheel 17, secured to the end of the adjacent shaft 14. An annular pulley 18 carries a series of bevel-pinions 19, which gear with the bevel-wheels 17, and on said pulley also is the sprocket-wheel $s$, to which extends the sprocket-driving chain 21. As the pulley 18 is driven by the chain the bevel-pinions and bevel-wheels are carried with it, the shafts of the axle being thus rotated together with their wheels, either of which, however, may rotate independently of the other through the intermediate gearing. The ends of the straight members or sections 10 and 12 are maintained in their proper axial relation by means of an oval yoke 22, clamped at its opposite sides to the sections 10 and 12, as shown, and open to permit the passage of a drive-chain, as described hereinafter. Upon the arched member of the rear axle, near each end of the same, are brazed cross-bearings 23, which have flat faces that serve as rests for the attachment of the lower members of the usual double elliptic or other springs. The arched member 13 has also collars 24, with sockets to receive the ends of perches 25.

While the arched member 13 may be made of tough wood, it is preferably a hollow steel tube, like the members 10 and 12, the ends being brazed into the socket-pieces C or otherwise firmly secured therein.

By the construction above described the two sections of the wheel-shafts are properly supported and maintained axially in line, while a proper chord is secured for the arched member and a rigid unyielding base is afforded for the rear springs of the vehicle.

The front axle A consists of the straight member 27 and the arched member 28, the ends of which extend into the separated ends of the socket-pieces C', similar to the socket-pieces C, but each of which has a fork $t$ at the outer end to receive a hub 30, from which projects the journal 31 of the adjacent front wheel. From the hub also extends an arm 32. At the center of the lower member 27 of the front axle is a bracket 33, which extends rearward parallel to a bracket 34, supported at the center of the arched member 28, and through these brackets and rigidly connected thereto is a vertical tube 35, which imparts rigidity to the axle and which further receives the steering-shaft 36, having at the lower end a rearwardly-projecting arm 37, connected by rods 38 38 with the arms 32 32 of the pivoted journals. The front spring rests on the bracket 34, and to the upper end of the steering-shaft 36 is pivoted the tiller m, which may thus be swung down or up, as may be required, by the party steering the vehicle.

In that class of vehicle-frames in which the front axle does not swing and where there are connecting-perches it is most desirable to maintain the parallelism of the axles and prevent them from rotating by the perches, and it is essential, therefore, to rigidly connect the ends of the perches and the axles. At the same time it is essential to permit either end of either axle to rise or fall independently of the other axle, and this without straining any of the parts or connections. Where the perches are bent or where wooden perches are employed, the torsion of the perches permits the desired play; but where straight metallic perches connected rigidly to the axles at the ends are used no torsion is permissible, and other means must be employed. We have secured the desired results by making each perch in sections maintained axially in line with each other and rigidly in position as regards the axles and incapable of independent longitudinal movement, but connected so that one can turn independently of the other. This secures the same effect as the use of a wooden perch, while enabling us to make a frame of metal throughout.

While the sectional perches may be differently constructed to secure the desired result, the construction shown has proved effective, each perch being made in two sections, as best shown in Fig. 7, each section being hollow and connected at one end with the socket-piece 24 of one of the arched members, one end 40 of one member being slit and expanded and then compressed and inserted in the other member, as shown in Fig. 7.

It is essential to connect the perch-sections so that they cannot operate longitudinally. This may be done in different ways; but as shown the forward section 25 of a perch has collars 41, between which is a loose sleeve 42, connected by a brace 43 with the adjacent socket-piece C or C'. In the construction shown the springs rest directly on the arched part of the axle B, which is therefore less liable to movement than the lower chord, in which the driving-shaft sections rotate. We therefore connect the ends of the perch-sections rigidly to the arched portions of the axle, thereby securing a much more rigid frame than would otherwise be possible, while, as the perch-sections are maintained in line with each other and are rigidly connected with the axle, there can be no possible turning of the axle independently of the perch—that is, the perch by its rigid connection prevents any such turning.

The perches and axles therefor constitute a rectangular rigid metallic frame, the parts immovably attached at the corners, yet parts of the perches are capable of such rotary action as will permit either corner of the frame to be raised or lowered without straining any part. Further, the perches are so connected to the arched members of the axles as not to interfere with any necessary attachments to the straight members.

Without limiting ourselves to the precise construction shown, we claim—

1. In a running-gear frame for vehicles, axles each having a continuous rigid lower member, a continuous arched upper member, and end socket-pieces each having two converging sockets in which the ends of said members are fixedly secured and perches connected to the upper members, substantially as set forth.

2. The combination of axles each consisting of a continuous lower tubular member, a continuous arched tubular upper member, socket-pieces having converging sockets in which the ends of said member are fixedly secured, a cross-piece secured to the upper member for the attachment of each spring resting thereon, and perches connected to the upper member, substantially as set forth.

3. The combination with the axles, of a vehicle, of perches connected at the ends immovably to the axles, each in two sections with connections between the forward section of each perch and the rear axle arranged to preserve the sections in line and to prevent any movement of said rear section independent of the axle, substantially as described.

4. The combination of axles having straight and arched members, perches connected at the ends rigidly to the arched members and each in sections connected to permit independent rotation, substantially as described.

5. The combination with the front and rear axles, of a vehicle, of perches connected at their ends rigidly thereto and each in connected sections capable of independent rotation, in respect to each other and maintained axially in line, substantially as described.

6. The combination with front and rear axles having arched members and perches connected fixedly at their ends to said members, and each in connected sections capable of independent rotation, substantially as described.

7. The combination in a running-gear frame of connected axles having straight and arched members and supports for the springs on the arched members, substantially as described.

8. The combination in a running-gear frame of connected axles having straight and arched members, perches rigidly connected at the ends to the arched members, and supports for the springs on the arched members, substantially as described.

In testimony whereof we have signed our names to this specification in the presence of two subscribing witnesses.

FRANCIS E. STANLEY.
  FREELAN O. STANLEY.

Witnesses:
 MARGARET L. HART,
 EMMA E. WALKER.